United States Patent
Castagna

(10) Patent No.: US 10,158,611 B2
(45) Date of Patent: Dec. 18, 2018

(54) SYSTEM FOR MULTIPLEXING AND DEMULTIPLEXING BLOCKCHAIN LEDGERS VIA A CRYPTOGRAPHIC HASH

(71) Applicant: Bank of America Corporation, Charlotte, NC (US)

(72) Inventor: Brandon Matthew Castagna, Mount Holly, NC (US)

(73) Assignee: Bank of America Corporation, Charlotte, NC (US)

( * ) Notice: Subject to any disclaimer, the term of this patent is extended or adjusted under 35 U.S.C. 154(b) by 170 days.

(21) Appl. No.: 15/354,740

(22) Filed: Nov. 17, 2016

(65) Prior Publication Data

US 2018/0139186 A1    May 17, 2018

(51) Int. Cl.
*H04L 29/06*    (2006.01)
*H04L 9/08*    (2006.01)
*H04L 9/32*    (2006.01)

(52) U.S. Cl.
CPC ........ *H04L 63/0428* (2013.01); *H04L 9/0861* (2013.01); *H04L 9/3242* (2013.01)

(58) Field of Classification Search
CPC .. H04L 63/0428; H04L 9/3242; H04L 9/0861
See application file for complete search history.

(56) References Cited

U.S. PATENT DOCUMENTS

| | | | |
|---|---|---|---|
| 5,200,864 A | 4/1993 | Dunn et al. | |
| 5,630,059 A | 5/1997 | Brady et al. | |
| 5,682,513 A | 10/1997 | Candelaria et al. | |
| 5,842,212 A | 11/1998 | Ballurio et al. | |
| 5,928,327 A | 7/1999 | Wang et al. | |
| 5,974,427 A | 10/1999 | Reiter | |
| 6,061,449 A | 5/2000 | Candelore et al. | |
| 6,137,954 A | 10/2000 | Sawabe et al. | |
| 6,414,610 B1 | 7/2002 | Smith | |
| 6,438,666 B2 | 8/2002 | Cassagnol et al. | |
| 6,931,532 B1 | 8/2005 | Davis et al. | |
| 6,941,459 B1 | 9/2005 | Hind et al. | |
| 6,978,367 B1 | 12/2005 | Hind et al. | |
| 7,213,260 B2 | 5/2007 | Judge | |
| 7,216,110 B1 | 5/2007 | Ogg et al. | |
| 2001/0049726 A1 | 12/2001 | Comeau et al. | |
| 2002/0016869 A1 | 2/2002 | Comeau et al. | |
| 2002/0131595 A1 | 9/2002 | Ueda et al. | |
| 2004/0215948 A1 | 10/2004 | Abbey et al. | |
| 2010/0076934 A1 | 3/2010 | Pershin et al. | |
| 2017/0039330 A1* | 2/2017 | Tanner, Jr. | G06F 19/328 |
| 2017/0357966 A1* | 12/2017 | Chandrasekhar | G06Q 20/3829 |
| 2018/0096121 A1* | 4/2018 | Goeringer | G06F 21/32 |

* cited by examiner

*Primary Examiner* — Meng Li
(74) *Attorney, Agent, or Firm* — Michael A. Springs; Moore & Van Allen PLLC; Patrick B. Horne

(57) ABSTRACT

Embodiments of the present invention provide a system for multiplexing and demultiplexing blockchain ledgers via a cryptographic hash. In particular, the invention uses cryptographic keys and hashes to combine and dissociate blockchain records from the private blockchains two or more entities. The system provides a mechanism by which blockchains owned by distinct entities may be multiplexed upon formation of a union between the entities, in order to securely share data records and establish an authentic, tamper-resistant timeline for said data records. Furthermore, the system provides a mechanism by which the blockchains may be demultiplexed upon dissolution of said union.

16 Claims, 5 Drawing Sheets

SYSTEM FOR MULTIPLEXING AND DEMULTIPLEXING BLOCKCHAIN LEDGERS VIA A CRYPTOGRAPHIC HASH

BACKGROUND

With the advent of the internet, it has become common for individuals and entities to utilize the internet to share their data with one another upon formation of a union or partnership. For instance, the individual or entity may use the internet to send copies of their data to one another by using e-mail attachments or uploading the files to a third party server.

There are a number of disadvantages to using this type of electronic data sharing method. First, the traditional methods of sending records are susceptible to data corruption, as they typically lack a built-in mechanism for authenticating records. Second, data, as well as the associated metadata, shared through traditional methods are prone to tampering by unauthorized parties through cyber-attacks and the like.

Accordingly, there is a need for a more secure and reliable way for individuals and entities to share data with one another.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system for multiplexing and demultiplexing two or more blockchains. The system comprises a first networked system comprising a first processor, a memory device, and a communication device, and a first blockchain application stored in the memory device, wherein the first blockchain application comprises a first private blockchain comprising a first data record; and a second networked system comprising a second processor, a memory device, and a communication device, and a second blockchain application stored in the memory device, wherein the second blockchain application comprises a second private blockchain comprising a second data record, wherein the first blockchain application when executed by the first processor causes the first processor to detect a union between a first entity and a second entity; publish a merger data record to the first private blockchain; and publish a shared data record to the first private blockchain, wherein the shared data record is accessible by the first blockchain application and the second blockchain application, wherein the second blockchain application when executed by the second processor causes the second processor to detect the union between the first entity and the second entity; publish the merger data record to the second private blockchain; and publish the shared data record to the second private blockchain.

In some embodiments, the first blockchain application when executed by the first processor further causes the first processor to detect a dissolution of the union between the first entity and the second entity; publish a dissolution data record to the first private blockchain; and publish a first private data record to the first private blockchain, wherein the first private data record is configured to be accessible by the first blockchain application, wherein the second blockchain application when executed by the second processor further causes the second processor to detect the dissolution of the union between the first entity and the second entity; publish the dissolution data record to the second private blockchain; and publish a second private data record to the second private blockchain, wherein the second private data record is configured to be accessible by the second blockchain application.

In some embodiments, detecting the union between the first entity and the second entity comprises the first blockchain application further causing the first processor to publish a merger request data record to the first private blockchain; generate a first set of cryptographic key pairs, wherein the first set of cryptographic key pairs comprises a first cryptographic public key and a first cryptographic private key; and publish a merger confirmation data record to the first private blockchain, wherein detecting the union between the first entity and the second entity comprises the second blockchain application further causing the second processor to detect the merger request data record; publish a merger acceptance data record to the second private blockchain; and generate a second set of cryptographic key pairs, wherein the second set of cryptographic key pairs comprises a second cryptographic public key and a first cryptographic private key.

In some embodiments, detecting the dissolution of the union between the first entity and the second entity comprises the first blockchain application further causing the first processor to publish a dissolution request data record to the first private blockchain; and publish a dissolution confirmation data record to the first private blockchain, wherein detecting the dissolution of the union between the first entity and the second entity comprises the second blockchain application further causing the first processor to detect the dissolution request data record; and publish a dissolution acceptance data record to the second private blockchain.

In some embodiments, the first blockchain application when executed by the first processor further causes the first processor to encrypt the shared data record using the first cryptographic public key, wherein the second blockchain application when executed by the second processor further causes the second processor to decrypt the shared data record using the first cryptographic private key.

In some embodiments, the second blockchain application when executed by the second processor further causes the second processor to encrypt the shared data record using the second cryptographic public key, wherein the first blockchain application when executed by the first processor further causes the first processor to decrypt the shared data record using the second cryptographic private key.

In some embodiments, the shared data record comprises a shared data record hash, wherein the shared data record hash is generated via a hash algorithm using at least the first cryptographic public key and a hash of a previous block in the blockchain.

Embodiments of the current invention further provide a computer program product for multiplexing and demultiplexing two or more blockchains, the computer program product comprising at least one non-transitory computer readable medium having computer-readable program code portions embodied therein, the computer-readable program code portions comprising an executable portion configured for detecting a union between a first entity and a second entity, wherein the first entity comprises a first private blockchain, wherein the second entity comprises a second private blockchain; an executable portion configured for publishing a merger data record to the first private blockchain; an executable portion configured for publishing the merger data record to the second private blockchain; an executable portion configured for publishing a shared data record to the first private blockchain, wherein the shared data record is configured to be accessible by the first entity and the second entity; and an executable portion configured for publishing the shared data record to the second private blockchain.

In some embodiments, the computer-readable program code portions further comprise an executable portion configured for detecting a dissolution of the union between the first entity and the second entity; an executable portion configured for publishing a dissolution data record to the first private blockchain; an executable portion configured for publishing the dissolution data record to the second private blockchain; an executable portion configured for publishing a first private data record to the first private blockchain, wherein the first private data record is configured to be accessible by the first entity; and an executable portion configured for publishing a second private data record to the second private blockchain, wherein the second private data record is configured to be accessible by the second entity.

In some embodiments, detecting the union between the first entity and the second entity comprises modifying the computer-readable program code portions to further comprise an executable portion configured for publishing a merger request data record to the first private blockchain; an executable portion configured for generating a first set of cryptographic key pairs, wherein the first set of cryptographic key pairs comprises a first cryptographic public key and a first cryptographic private key; and an executable portion configured for publishing a merger confirmation data record to the first private blockchain, an executable portion configured for detecting the merger request data record; an executable portion configured for publishing a merger acceptance data record to the second private blockchain; and an executable portion configured for generating a second set of cryptographic key pairs, wherein the second set of cryptographic key pairs comprises a second cryptographic public key and a first cryptographic private key.

In some embodiments, detecting the dissolution of the union between the first entity and the second entity comprises modifying the computer-readable program code portions to further comprise an executable portion configured for publishing a dissolution request data record to the first private blockchain; an executable portion configured for publishing a dissolution confirmation data record to the first private blockchain, an executable portion configured for detecting the dissolution request data record; and an executable portion configured for publishing a dissolution acceptance data record to the second private blockchain.

In some embodiments, the computer-readable program code portions further comprise an executable portion configured for encrypting the shared data record using the first cryptographic public key; and an executable portion configured for decrypting the shared data record using the first cryptographic private key.

In some embodiments, the computer-readable program code portions further comprise an executable portion configured for encrypting the shared data record using the second cryptographic public key; and an executable portion configured for decrypting the shared data record using the second cryptographic private key.

Embodiments of the current invention further provide a computer-implemented method for multiplexing and demultiplexing two or more blockchains between a first networked system and a second networked system, wherein the first networked system comprises a first processor, a memory device, and a communication device, and a first blockchain application stored in the memory device, wherein the first blockchain application comprises a first private blockchain comprising a first data record, wherein the second networked system comprises a second processor, a memory device, and a communication device, and a second blockchain application stored in the memory device, wherein the second blockchain application comprises a second private blockchain comprising a second data record. The method comprises detecting, by the first processor executing the first blockchain application, a union between a first entity and a second entity; publishing, by the first processor executing the first blockchain application, a merger data record to the first private blockchain; publishing, by the first processor executing the first blockchain application, a shared data record to the first private blockchain, wherein the shared data record is configured to be accessible by the first blockchain application and the second blockchain application; detecting, by the second processor executing the second blockchain application, the union between the first entity and the second entity; publishing, by the second processor executing the second blockchain application, the merger data record to the second private blockchain; and publishing, by the second processor executing the second blockchain application, the shared data record to the second private blockchain.

In some embodiments, the method further comprises detecting, by the first processor executing the first blockchain application, a dissolution of the union between the first entity and the second entity; publishing, by the first processor executing the first blockchain application, a dissolution data record to the first private blockchain; publishing, by the first processor executing the first blockchain application, a first private data record to the first private blockchain, wherein the first private data record is configured to be accessible by the first blockchain application; detecting, by the second processor executing the second blockchain application, the dissolution of the union between the first entity and the second entity; publishing, by the second processor executing the second blockchain application, the dissolution data record to the second private blockchain; and publishing, by the second processor executing the second blockchain application, a second private data record to the second private blockchain, wherein the second private data record is configured to be accessible by the second blockchain application.

In some embodiments, detecting the union between the first entity and the second entity comprises publishing, by the first processor executing the first blockchain application, a merger request data record to the first private blockchain; generating, by the first processor executing the first blockchain application, a first set of cryptographic key pairs, wherein the first set of cryptographic key pairs comprises a first cryptographic public key and a first cryptographic private key; publishing, by the first processor executing the first blockchain application, a merger confirmation data record to the first private blockchain; detecting, by the second processor executing the second blockchain application, the merger request data record; publishing, by the second processor executing the second blockchain application, a merger acceptance data record to the second private blockchain; and generating, by the second processor executing the second blockchain application, a second set of cryptographic key pairs, wherein the second set of cryptographic key pairs comprises a second cryptographic public key and a first cryptographic private key.

In some embodiments, detecting the dissolution of the union between the first entity and the second entity comprises publishing, by the first processor executing the first blockchain application, a dissolution request data record to the first private blockchain; publishing, by the first processor executing the first blockchain application, a dissolution confirmation data record to the first private blockchain; detecting, by the second processor executing the second blockchain application, the dissolution request data record; and publishing, by the second processor executing the second blockchain application, a dissolution acceptance data record to the second private blockchain.

In some embodiments, the method further comprises encrypting, by the first processor executing the first blockchain application, the shared data record using a first cryptographic public key; and decrypting, by the second processor executing the second blockchain application, the shared data record using the first cryptographic private key.

In some embodiments, the method further comprises encrypting, by the second processor executing the second blockchain application, the shared data record using a second cryptographic public key; and decrypting, by the first processor executing the first blockchain application, the shared data record using the second cryptographic private key.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
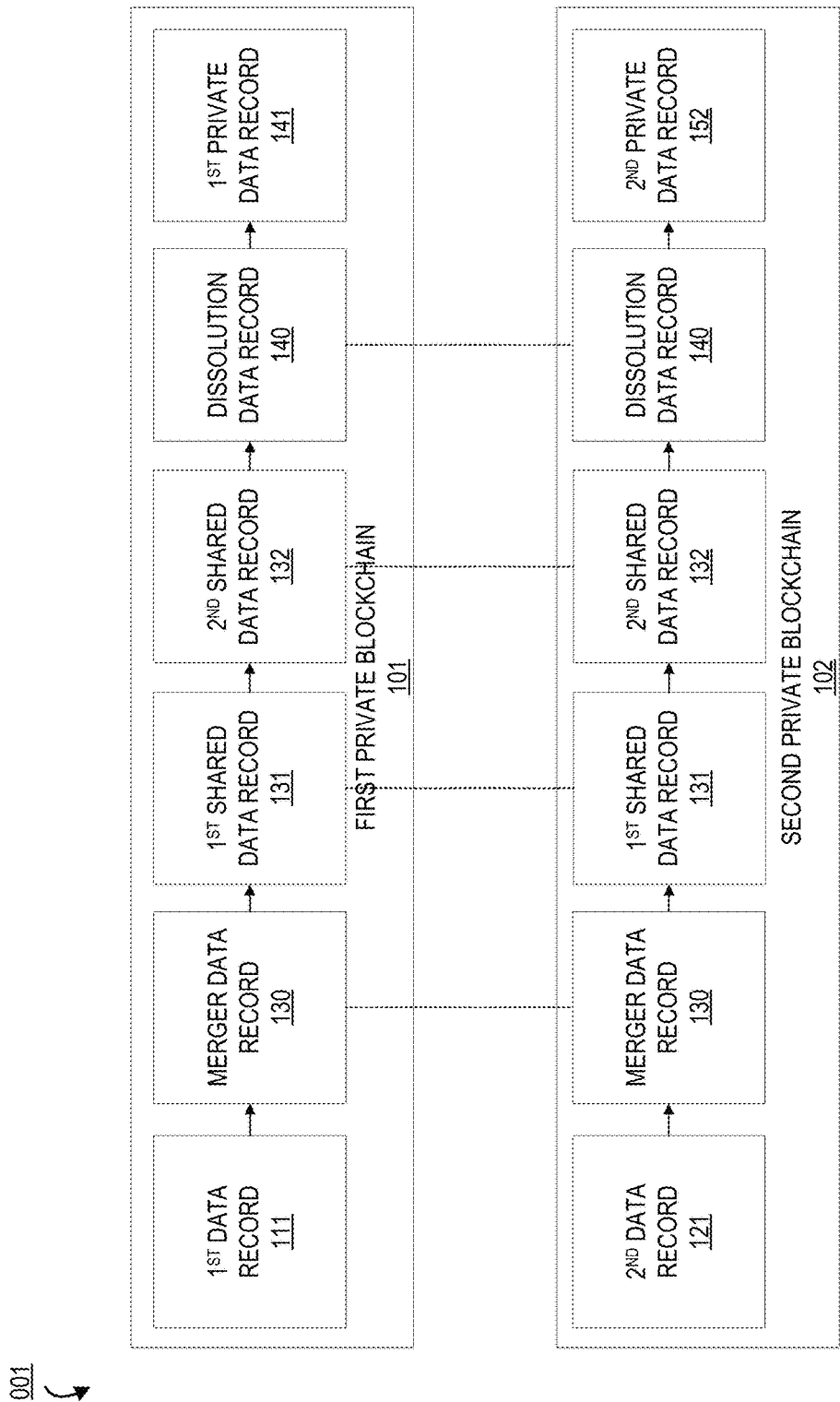
Figure 2:
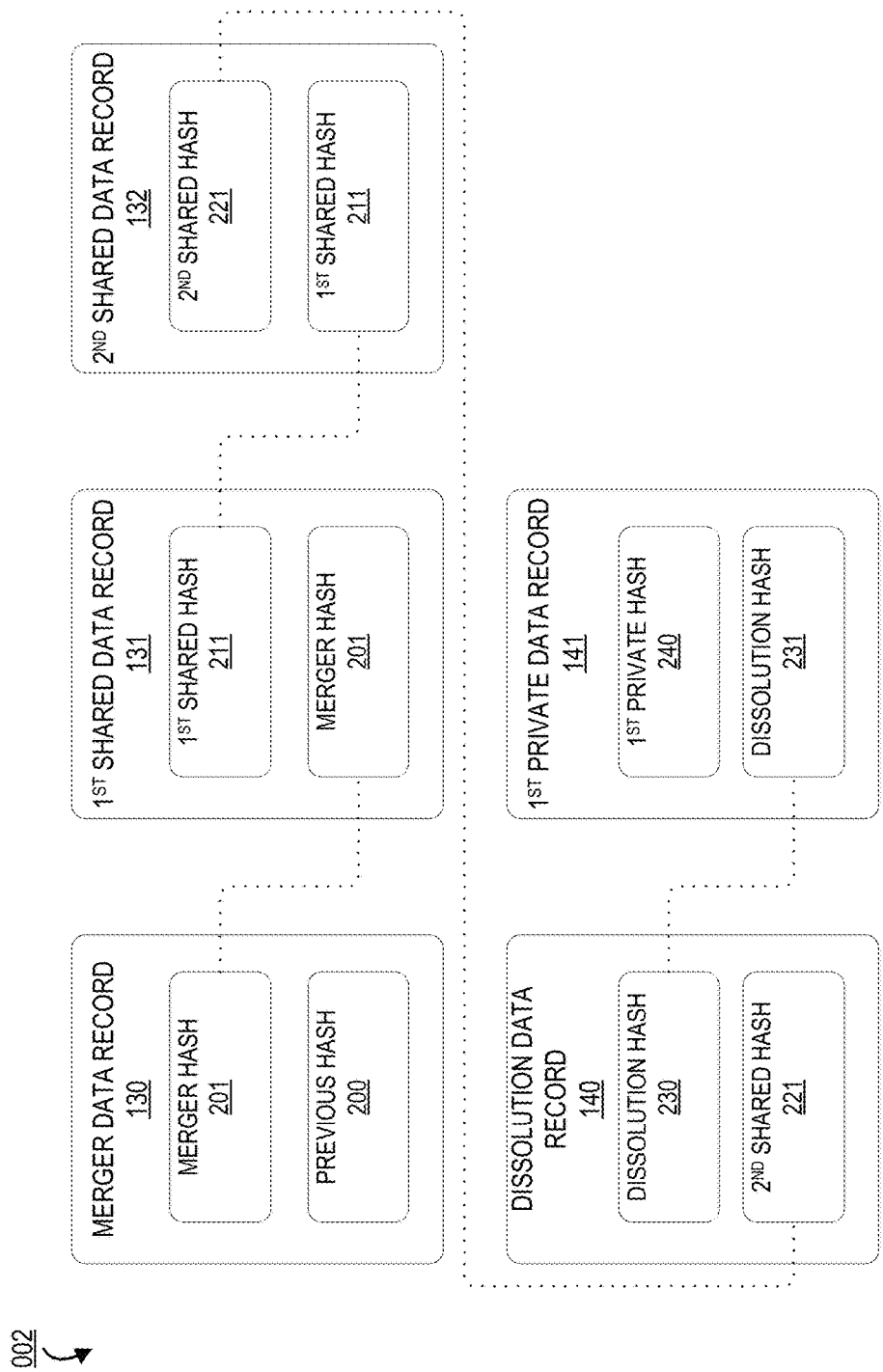
Figure 3:
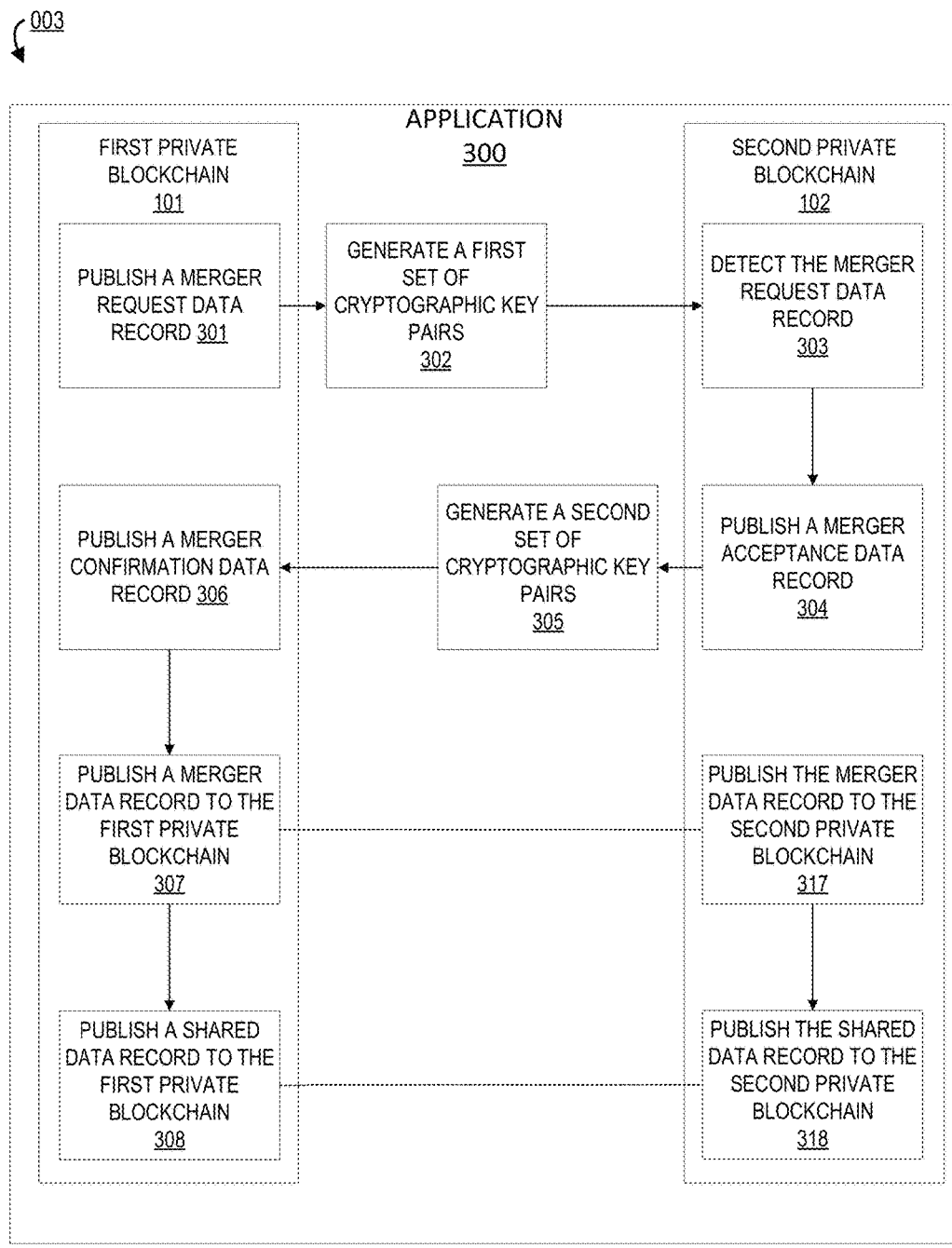
Figure 4:
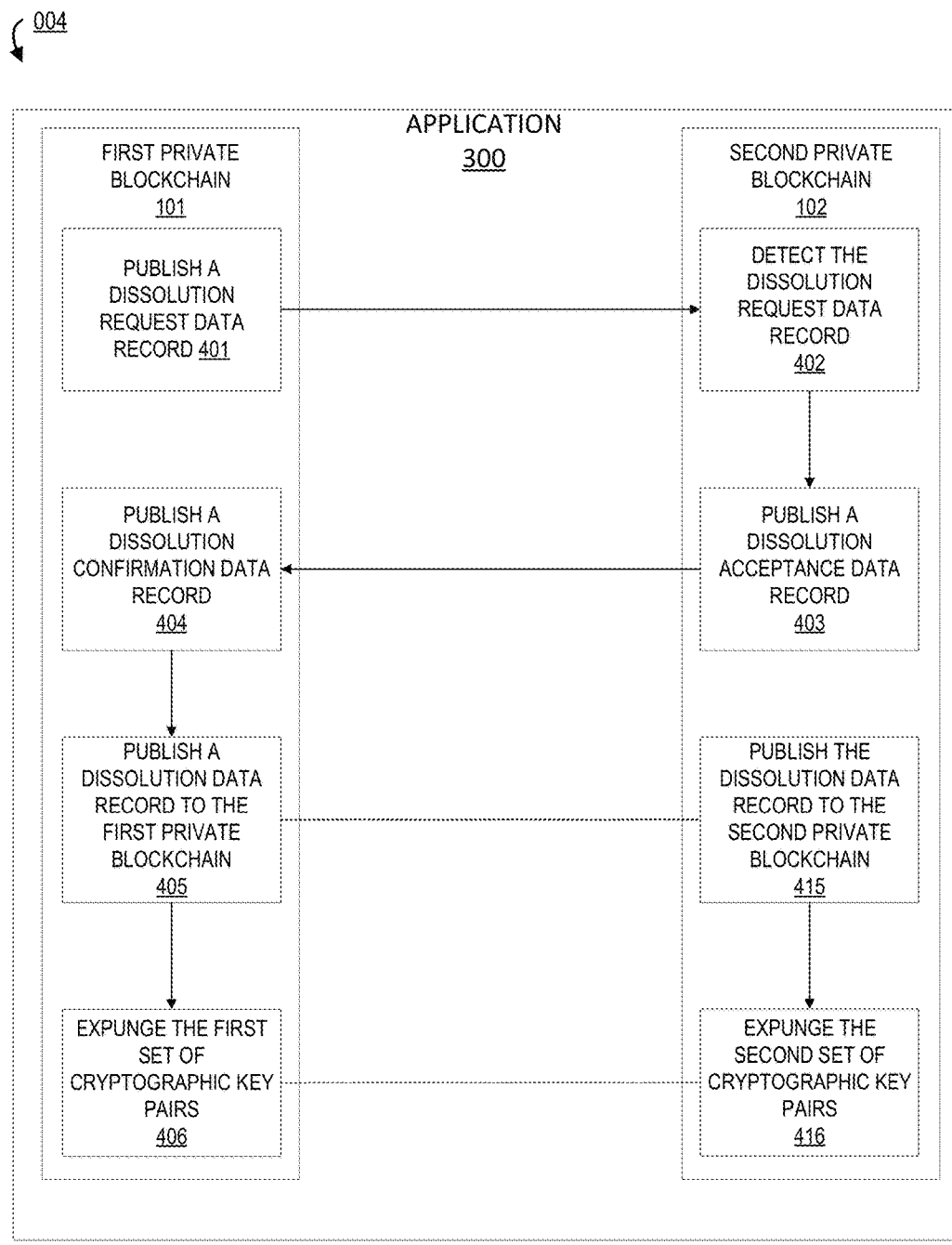
Figure 5:
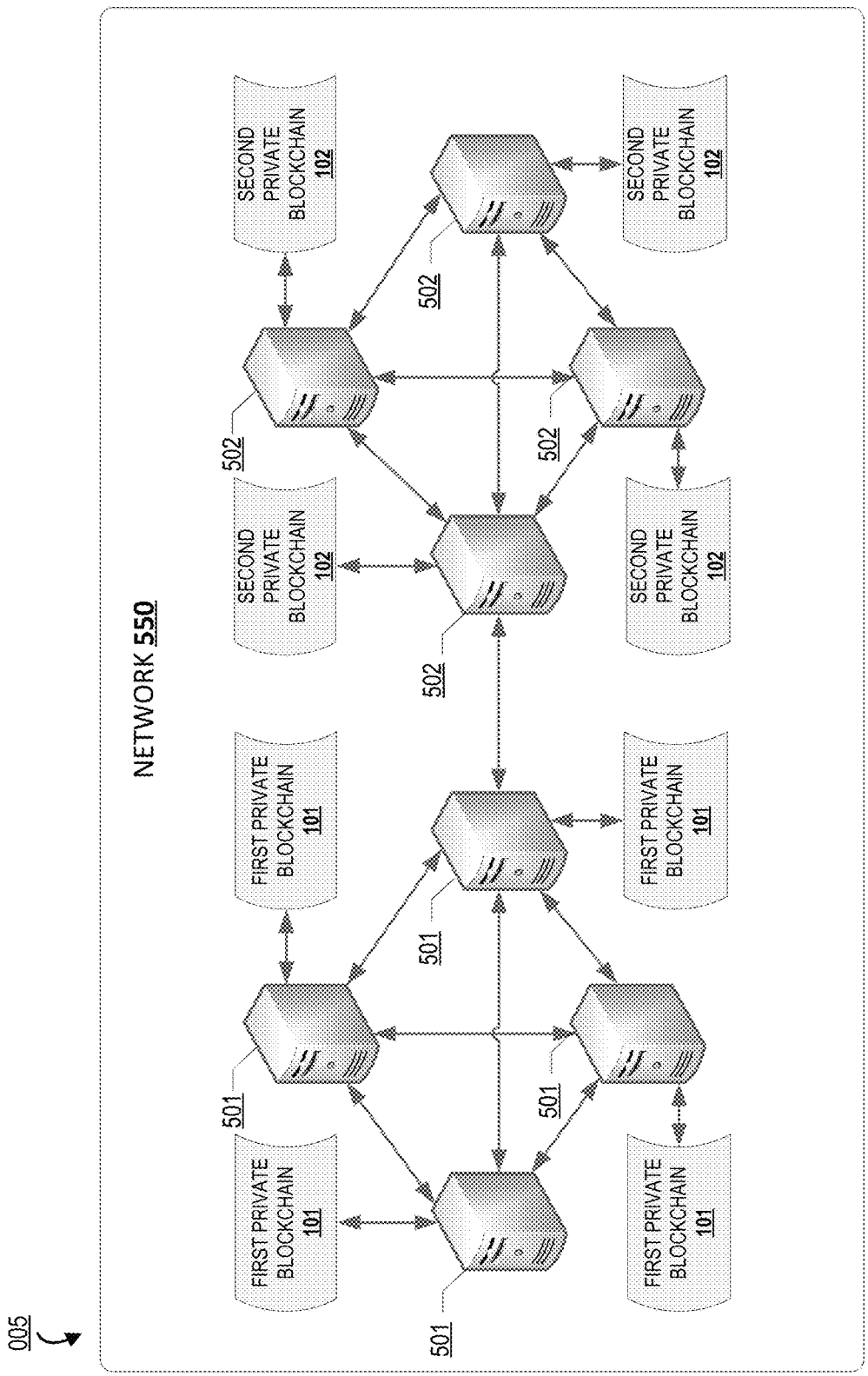

Having thus described embodiments of the invention in general terms, reference will now be made to the accompanying drawings, wherein:

FIG. 1 is a block diagram illustrating a high level overview of a system for multiplexing and demultiplexing two or more blockchains, in accordance with one embodiment of the present invention;

FIG. 2 is a block diagram illustrating a system for using cryptographic hashes to authenticate data records, in accordance with one embodiment of the present invention;

FIG. 3 is a combination block and process flow diagram illustrating a process for multiplexing two or more blockchains, in accordance with one embodiment of the present invention;

FIG. 4 is a combination block and process flow diagram illustrating a process for demultiplexing two or more blockchains, in accordance with one embodiment of the present invention; and FIG. 5 is a symbol diagram illustrating the components of a system for multiplexing and demultiplexing blockchain ledgers, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Embodiments of the present invention provide a system for multiplexing and demultiplexing blockchain ledgers via a cryptographic hash. In particular, the invention uses time-limited cryptographic key pairs and cryptographic hashes to combine and dissociate blockchain records from the private blockchains two or more entities. Upon forming a union, the entities involved may wish to create a secure way to share data that is relevant to the union. On the other hand, upon dissolution of the union, the entities may wish to ensure that data is not accessible to any of the other entities. Accordingly, the system provides a mechanism by which blockchains owned by distinct entities may be multiplexed upon formation of a union between the entities, in order to securely share data records and establish an authentic, tamper-resistant timeline for said data records. Furthermore, the system provides a mechanism by which the blockchains may be demultiplexed upon dissolution of said union. By using blockchain technology in this manner, the system addresses a number of computer technology-centric challenges as described above. In particular, the use of cryptographic hashes in a blockchain improves the security of computer systems by ensuring that only authorized cryptographic key holders may access the data within the blockchains. The invention also ensures the authenticity of both the data within the blockchains' timelines, protecting against the inclusion of unverified or malicious data. Finally, the invention improves processing efficiencies of the various systems utilizing the private blockchain by avoiding desynchronization of data and preventing the computer systems from making superfluous authorization and confirmation requests, thereby greatly reducing the amount of computing resources required to authorizing and restricting data access, including, but not limited to, processing power, memory space, storage space, cache space, electric power, networking bandwidth, and I/O calls.

"Blockchain" as used herein refers to a distributed electronic ledger of data records which are authenticated by a federated consensus protocol. Multiple computer systems within the blockchain, referred to herein as "nodes" or "compute nodes," each comprise a copy of the entire ledger of records. Nodes may write a "block" to the blockchain, where the block may comprise data and metadata, including a reference to the previous "block" in the chain. In some embodiments, a "data record" may be a block on the blockchain, wherein the data record contains electronically stored data for a particular entity, where the entity may be an individual or organization.

A "private blockchain" as used herein is a blockchain in which only authorized nodes may access the blockchain. In some embodiments, nodes must be authorized to write to the blockchain. In some embodiments, nodes must also be authorized to read from the blockchain. In some embodiments, once a data record is written to the blockchain, it will be considered pending and awaiting authentication by the miner nodes in the blockchain. In other embodiments, the private blockchain may accept data records as valid without validation by miner nodes. Through use of a private blockchain in this manner, an entity may store important documents in a secure manner that is not susceptible to a single point of failure, as is the case in traditional systems.

Each block on the private blockchain may comprise an identifier for the block. In some embodiments, the identifier may be a cryptographic hash. A unique cryptographic hash is generated by providing an input to a hash function, such as SHA-3. The length of the input strings may vary, but the hash for any given input will have a fixed bit length. The values of a hash produced by a first input will generally be highly distinguishable from the values of a hash produced by a second input, irrespective of the similarities or dissimilarities of the two inputs. The asymmetric nature of the hash function allows a computer to use a relatively small amount of processing power and time to create a specific hash if the input is known, but makes it difficult or unfeasible to reproduce the specific input based on the hash.

In some embodiments, each block may further comprise an identifier for the previous block in the chain. In one exemplary embodiment, the identifier for the previous block is a second cryptographic hash, which is distinct from the first cryptographic hash. The blocks may further comprise a time stamp indicating the time at which the block was created. By linking blocks in this way, the blockchain contains a reliable, tamper-resistant history of all relevant records stored on a blockchain for a particular entity. In some embodiments, the pointer may be a fix-length hash generated by a hash function. In this way, the order of the blocks in history may be preserved. In some embodiments, the block may further comprise metadata indicating the node that was the originator of the transaction.

"Miner node" as used herein refers to a networked computer system that authenticates and verifies the integrity of pending data records on the blockchain. In some embodiments, a pending data record may require validation by a threshold number of miner nodes. Once the threshold number of miners has validated the data record, the data record becomes an authenticated block on the blockchain. By using this method of validating data records via a federated consensus mechanism, duplicate or erroneous records are prevented from becoming part of the accepted blockchain, thus reducing the risk of data record tampering and increasing the security of the transactions within the system. In some embodiments, the system may require the miner nodes within the blockchain to calculate a "proof of work" in order to validate the data record.

Some embodiments of the invention may utilize asymmetric cryptography to secure the data records on the private blockchain. For instance, a data record may be encrypted with a first cryptographic key such that the record may only be decrypted using a corresponding second cryptographic key. In such an embodiment, a record encrypted using the second cryptographic key can likewise only be decrypted using the first cryptographic key. In this way, the system provides for a more secure way to prevent unauthorized access to sensitive information while selectively providing the records to the service providers who require them. In some embodiments, the method of asymmetric cryptography may comprise a private key and a public key corresponding to each other, such that data encrypted using the private key may only be decrypted using the public key, and vice versa. In some embodiments, the private key is configured to be used exclusively by a single individual or entity, while the public key may be distributed to one or more individuals or entities. Data encrypted by the public key may only be decrypted by the holder of the private key—in such a case, the sender of the data may verify that the data may only be viewed by the intended recipient, i.e. the sole owner of the corresponding private key.

In some embodiments, the first entity's systems may generate a first set of cryptographic key pairs, comprising a first cryptographic public key and a first cryptographic private key. The set of cryptographic key pairs may be configured to last only until the dissolution of the union between two entities. Once generated, the first cryptographic public key may be used by the first entity to encrypt data records to be shared with the second entity. The second entity may then use the first cryptographic private key to decrypt the shared data record. In one embodiment, the sharing may be one-directional, with the first entity having write access to share data records with the second entity, while the second entity does not have write access and can only read shared data records.

In other embodiments, the sharing may be bi-directional, with both entities writing data records to be shared with one another. In such an embodiment, the second entity's systems may generate a second set of cryptographic key pairs, comprising a second cryptographic public key and a second cryptographic private key. The second cryptographic public key may be used by the second entity to encrypt data records to be shared with the first entity, after which the first entity may use the second cryptographic private key to decrypt the shared data record.

FIG. 1 is a block diagram illustrating a high level overview of a system 001 for multiplexing and demultiplexing two or more blockchains, in accordance with one embodiment of the present invention. The system comprises first private blockchain 101 and a second private blockchain 102, each comprising a plurality of data records. In some embodiments, the first private blockchain 101 is owned by a first entity, and the second private blockchain 102 is owned by a second entity, where an entity may be an individual or an organization. The first private blockchain 101 may comprise a first data record 111, and the second private blockchain 102 may comprise a second data 121. The first data record 111 is written to the first private blockchain 101 before a merger with the second private blockchain 102, and thus may not be accessed by the owner of the second private blockchain 102. Furthermore, the second data record 121 is written to the second private blockchain 102 before the merger with the first private blockchain 101, and thus the second data record 121 cannot be accessed by the owner of the first private blockchain 101. In some embodiments, the first data record 111 may be encrypted using a first cryptographic public key, such that it may only be decrypted using a first cryptographic private key, while the second data record 121 may be encrypted using a second cryptographic public key, such that it may only decrypted using a second cryptographic private key.

The system may write a merger data record 130 in parallel to both the first private blockchain 101 and the second private blockchain 102 upon detection of a union between the first entity and the second entity. Such a union may include, but is not limited to, a marriage, a professional relationship, or a business partnership or merger. The merger data record 130 may further comprise a timestamp, causing the merger data record 130 to signal the time at which the union was formed. Thereafter, a number of shared data records 131, 132 may be written in parallel to both the first private blockchain 101 and the second private blockchain 102, where the shared data records are relevant to the union between the two entities. The shared data records 131, 132 may be configured to be accessed by both the first entity and the second entity for the duration of the union.

In some embodiments, the system may detect a second union between the first entity and a third entity and write a second merger data record in parallel to the first private blockchain 101 and a third private blockchain. The system may subsequently write shared data records corresponding to the union between the first entity and the third entity. In some embodiments, the first, second, and third entity form a single union and share data records accordingly. In other embodiments, the first and second entities form a first union that is distinct from the second union formed between the first and third entities.

Subsequent to the addition of the merger data record 130 to the private blockchains 101, 102, the system may detect that the union between the first entity and the second entity has been dissolved, such as by divorce or termination of the business relationship or partnership. In such a case, the system may write, in parallel, a dissolution data record 140 to both the first private blockchain 101 and the second private blockchain 102. The dissolution data record 140 may further comprise a time stamp to signal the time at which the union was dissolved. In such a case, a first private data record 141 may be written to the first private blockchain 101 subsequent to the dissolution data record 140, wherein the first private data record 141 is not accessible to the second entity. Likewise, a second private data record 152 may be written to the second private blockchain 102 subsequent to the dissolution data record 140, wherein the second private data record 152 is not accessible to the first entity.

In some embodiments, the system may detect the dissolution of the second union between the first and third entity and write a second dissolution data record in parallel to the first private blockchain 101 and the third private blockchain. Subsequent to the second dissolution data record, data records written to the first private blockchain 101 may not be accessible to the third entity, and data records written to the third private blockchain may not be accessible to the first entity.

FIG. 2 is a block diagram illustrating a system 002 for using cryptographic hashes to authenticate data records, in accordance with one embodiment of the present invention. In some embodiment, each data record in a private blockchain comprises at least one cryptographic hash generated by a cryptographic hash function. In some embodiments, each data record aside from the first data record in the blockchain comprises a cryptographic hash to identify itself as well as a cryptographic hash to identify the directly previous block in the blockchain. For instance, the merger data record 130 may comprise a merger hash 201 to uniquely identify the merger data record 130 and a previous hash 200 to identify the previous block in the blockchain. In some embodiments, the input to generate the merger hash 201 may comprise a cryptographic public key and the hash of the previous block in the blockchain. In some embodiments, the merger data record 130 may be the origin block in the blockchain, in which case the previous hash 200 would be absent. The first shared data record 131 comprises a first shared hash 211 to uniquely identify the first shared data record 131, and the merger hash 201 to identify the merger data record 130—the previous block in the blockchain. Similarly, the second shared data record 132 comprises a second shared hash 221 to uniquely identify the second shared data record 132, and the first shared hash 211 to identify the first shared data record 131—the previous block in the blockchain.

In some embodiments, the input that generates the merger hash 201, first shared hash 211, and second shared has 221 comprises a cryptographic public key corresponding to a cryptographic private key. In some embodiments, the input may further comprise the hash of the previous block in the blockchain. In this way, the system may generate unique hashes for each shared data record 211, 221 while enabling the system to distinguish between data records to be shared from other data records.

Upon dissolution of a union between entities, a dissolution data record 140 may be written to the private blockchains of the entities. The dissolution data record 140 comprises a dissolution hash 230 to uniquely identify the dissolution data record 140, and the hash of the previous block in the blockchain, such as the second shared hash 221. Subsequent to the dissolution data record 140, a private data record may be written to the private blockchain of an entity that was part of the former union. In some embodiments, the dissolution data record 140 will trigger the revocation of access rights, achieved by expunging the cryptographic public and private key pairs used to encrypt the shared data records. In this way, both entities may ensure that shared data records may only be accessed by the parties to the extent that the union is ongoing. Upon dissolution of the union, the cryptographic keys become invalid.

FIG. 3 is a combination block and process flow diagram illustrating a process 003 for multiplexing two or more blockchains within an application 300, in accordance with one embodiment of the present invention. The process begins at steps 301, wherein the nodes for the first private blockchain 101 publish a merger request data record to the first private blockchain 101. In some embodiments, this step will occur manually by user input from the first entity. In other embodiments, the system may automatically detect that the merger has happened by data located within the first entity's servers or a third party server, and publish the request record accordingly. The request record may comprise a digital address that indicates the intended recipient of the request, which in some embodiments may be the second entity. In some embodiments, the address may be a cryptographic hash.

The process continues to step 302, wherein the application generates a first set of cryptographic key pairs. The first set of cryptographic key pairs may comprise a first cryptographic public key and a first cryptographic private key. The first cryptographic public key may be used to publish shared data records to the first private blockchain. The first cryptographic private key may be distributed to the second entity such that the second entity may use the first cryptographic private key to decrypt the shared data records and access the shared data records on the first private blockchain 101. In some embodiments, a copy of the shared data record may be written to the second private blockchain 102

The process continues to step 303, wherein the nodes of the second private blockchain 102 detect the merger request data record. At this step, the nodes of the second private blockchain 102 may verify the digital signature of the nodes of the first blockchain to confirm the first entity's identity. In this way, the second entity may ensure that the sharing of data records will only occur between authorized parties.

The process continues to step 304, wherein the nodes of the second private blockchain 102 publish a merger acceptance data record to the second private blockchain 102. This signifies that the second entity has accepted the merger request. In some embodiments, the merger acceptance data record may be directed to the digital address of the first entity.

The process continues to step 305, wherein the application generates a second set of cryptographic key pairs. The second set of cryptographic key pairs may comprise a second cryptographic public key and a second cryptographic private key. The second cryptographic public key may be used to publish shared data records to the second private blockchain. The second cryptographic private key may be distributed to the first entity so that the first entity may use the second cryptographic private key to decrypt and access the shared data records on the second private blockchain 102. In some embodiments, a copy of the shared data record may be written to the first private blockchain 101.

The process continues to step 306, wherein the nodes of the first private blockchain 101 publish a merger confirmation data record to the first private blockchain 101. The merger confirmation data record confirms that both entities have acknowledged and accepted the merger.

The process continues to step 307, wherein the nodes of the first private blockchain 101 publish a merger data record to the first private blockchain 307. The merger data record indicates to the system that the blockchains within the union are to be multiplexed, and any shared data records that reference the merger data record are designated to be shared with entities within the union. As indicated by the dotted lines, this step occurs in parallel with step 317, wherein the nodes of the second private blockchain 102 publish the merger data record to the second private blockchain 102.

Finally, the process continues to step 308, wherein the nodes for the first private blockchain 101 publish a shared data record to the first private blockchain 101. In some embodiments, the shared data record may comprise a hash generated from the input of the hash of the merger data record, thereby identifying it as a data record to be shared with the second entity. This step occurs in parallel to step 318, in which the nodes for the second private blockchain 102 publish the shared data record to the second private blockchain 102.

FIG. 4 is a combination block and process flow diagram illustrating a process 004 for demultiplexing two or more blockchains in an application 300, in accordance with one embodiment of the present invention. The process begins at step 401, wherein the nodes of the first private blockchain 101 publish a dissolution request data record to the first private blockchain 101. In some embodiments, this step will occur manually by user input from the first entity. In other embodiments, the system may automatically detect that the dissolution has happened by data located within the first entity's servers or a third party server, and publish the request record accordingly. The dissolution request record may comprise a digital address that indicates the intended recipient of the request, which in some embodiments may be the second entity. In some embodiments, the address may be a cryptographic hash.

The process continues to step 402, wherein the nodes of the second private blockchain 102 detect the dissolution request data record. At this step, the nodes of the second private blockchain 102 may verify the digital signature of the nodes of the first blockchain to confirm the first entity's identity. In this way, the second entity may ensure the authenticity of the dissolution request.

The process continues to step 403, wherein the nodes of the second private blockchain 102 publish a dissolution acceptance data record to the second private blockchain 102. This signifies that the second entity has accepted the dissolution request. In some embodiments, the dissolution acceptance data record may be directed to the digital address of the first entity.

The process continues to step 404, wherein the nodes of the first private blockchain 101 publish a dissolution confirmation data record to the first private blockchain 101. The dissolution confirmation data record confirms that both entities have acknowledged and accepted the dissolution.

The process continues to step 405, wherein the nodes of the first private blockchain 101 publish a dissolution data record to the first private blockchain 101. The dissolution data record indicates to the system that the blockchains within the union are to be demultiplexed. As indicated by the dotted lines, this step occurs in parallel with step 415, wherein the nodes of the second private blockchain 102 publish the dissolution data record to the second private blockchain 102.

Finally, the process continues to step 406, wherein the nodes for the first private blockchain 101 expunge the first set of cryptographic key pairs. After this step, the second entity may no longer access the data records on the first private blockchain 101 by using the first cryptographic private key. This step may occur in parallel to step 416, in which the nodes for the second private blockchain 102 expunge the second set of cryptographic key pairs. After this step, the first entity may no longer access the data records on the second private blockchain 102 by using the second cryptographic private key.

FIG. 5 is a symbol diagram illustrating the components of a system 005 for multiplexing and demultiplexing blockchain ledgers, in accordance with one embodiment of the present invention. A plurality of first computer systems, or first nodes 501, are in operative networked communication with one another and a plurality of second computer systems, or second nodes 502, through a network 550. The network 550 may be a system specific distributive network receiving and distributing specific network feeds and identifying specific network associated triggers. The network 550 may also be a global area network (GAN), such as the Internet, a wide area network (WAN), a local area network (LAN), or any other type of network or combination of networks. The network 550 may provide for wireline, wireless, or a combination wireline and wireless communication between devices on the network 550.

Each of the first nodes 501 comprise a copy of the first private blockchain 101, thereby providing the first entity with access to the first private blockchain 101 as well as the ability to use a consensus mechanism to verify the integrity of the data therein. Likewise, each of the second nodes 502 comprise a copy of the second private blockchain 102. In some embodiments, the first private blockchain 101 may be stored on durable storage mediums within each of the first nodes 501, and the second private blockchain 102 may be stored on durable storage mediums within each of the second nodes 502. In some embodiments, the durable storage medium may be RAM. In some embodiments, the durable storage medium may be a hard drive or flash drive within the system.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for multiplexing and demultiplexing two or more blockchains, comprising:
    a first networked system comprising a first processor, a first memory device, and a first communication device, and a first blockchain application stored in the first memory device, wherein the first blockchain application comprises a first private blockchain comprising a first data record; and
    a second networked system comprising a second processor, a second memory device, and a second communication device, and a second blockchain application stored in the second memory device, wherein the second blockchain application comprises a second private blockchain comprising a second data record,
    wherein the first blockchain application when executed by the first processor causes the first processor to:
        detect a union between a first entity and a second entity comprising:
            publishing a merger request data record to the first private blockchain;
            generating a first set of cryptographic key pairs, wherein the first set of cryptographic key pairs comprises a first cryptographic public key and a first cryptographic private key; and
            publishing a merger confirmation data record to the first private blockchain;

publish a merger data record to the first private blockchain; and
publish a shared data record to the first private blockchain, wherein the shared data record is accessible by the first blockchain application and the second blockchain application,
wherein the second blockchain application when executed by the second processor causes the second processor to:
detect the union between the first entity and the second entity, comprising:
detecting the merger request data record;
publishing a merger acceptance data record to the second private blockchain; and
generating a second set of cryptographic key pairs, wherein the second set of cryptographic key pairs comprises a second cryptographic public key and a first cryptographic private key;
publish the merger data record to the second private blockchain; and
publish the shared data record to the second private blockchain.

2. The system of claim 1, wherein the first blockchain application when executed by the first processor further causes the first processor to:
detect a dissolution of the union between the first entity and the second entity;
publish a dissolution data record to the first private blockchain; and
publish a first private data record to the first private blockchain, wherein the first private data record is configured to be accessible by the first blockchain application,
wherein the second blockchain application when executed by the second processor further causes the second processor to:
detect the dissolution of the union between the first entity and the second entity;
publish the dissolution data record to the second private blockchain; and
publish a second private data record to the second private blockchain, wherein the second private data record is configured to be accessible by the second blockchain application.

3. The system of claim 2, wherein detecting the dissolution of the union between the first entity and the second entity comprises the first blockchain application further causing the first processor to:
publish a dissolution request data record to the first private blockchain; and
publish a dissolution confirmation data record to the first private blockchain,
wherein detecting the dissolution of the union between the first entity and the second entity comprises the second blockchain application further causing the second processor to:
detect the dissolution request data record; and
publish a dissolution acceptance data record to the second private blockchain.

4. The system of claim 1, wherein the first blockchain application when executed by the first processor further causes the first processor to encrypt the shared data record using the first cryptographic public key, wherein the second blockchain application when executed by the second processor further causes the second processor to decrypt the shared data record using the first cryptographic private key.

5. The system of claim 1, wherein the second blockchain application when executed by the second processor further causes the second processor to encrypt the shared data record using the second cryptographic public key, wherein the first blockchain application when executed by the first processor further causes the first processor to decrypt the shared data record using the second cryptographic private key.

6. The system of claim 1, wherein the shared data record comprises a shared data record hash, wherein the shared data record hash is generated via a hash algorithm using at least the first cryptographic public key and a hash of a previous block.

7. A computer program product for multiplexing and demultiplexing two or more blockchains, the computer program product comprising at least one non-transitory computer readable medium having computer-readable program code portions embodied therein, the computer-readable program code portions comprising:
an executable portion configured for detecting a union between a first entity and a second entity, wherein the first entity comprises a first private blockchain, wherein the second entity comprises a second private blockchain, wherein detecting comprises modifying the computer-readable program code portions to further comprise:
an executable portion configured for publishing a merger request data record to the first private blockchain;
an executable portion configured for generating a first set of cryptographic key pairs, wherein the first set of cryptographic key pairs comprises a first cryptographic public key and a first cryptographic private key;
an executable portion configured for publishing a merger confirmation data record to the first private blockchain,
an executable portion configured for detecting the merger request data record;
an executable portion configured for publishing a merger acceptance data record to the second private blockchain; and
an executable portion configured for generating a second set of cryptographic key pairs, wherein the second set of cryptographic key pairs comprises a second cryptographic public key and a first cryptographic private key;
an executable portion configured for publishing a merger data record to the first private blockchain;
an executable portion configured for publishing the merger data record to the second private blockchain;
an executable portion configured for publishing a shared data record to the first private blockchain, wherein the shared data record is configured to be accessible by the first entity and the second entity; and
an executable portion configured for publishing the shared data record to the second private blockchain.

8. The computer program product of claim 7, wherein the computer-readable program code portions further comprise:
an executable portion configured for detecting a dissolution of the union between the first entity and the second entity;
an executable portion configured for publishing a dissolution data record to the first private blockchain;
an executable portion configured for publishing the dissolution data record to the second private blockchain;
an executable portion configured for publishing a first private data record to the first private blockchain, wherein the first private data record is configured to be accessible by the first entity; and an executable portion configured for publishing a second private data record to the second private blockchain, wherein the second private data record is configured to be accessible by the second entity.

9. The computer program product of claim 8, wherein detecting the dissolution of the union between the first entity and the second entity comprises modifying the computer-readable program code portions to further comprise:

an executable portion configured for publishing a dissolution request data record to the first private blockchain;

an executable portion configured for publishing a dissolution confirmation data record to the first private blockchain, an executable portion configured for detecting the dissolution request data record; and an executable portion configured for publishing a dissolution acceptance data record to the second private blockchain.

10. The computer program product of claim 7, wherein the computer-readable program code portions further comprise:

an executable portion configured for encrypting the shared data record using the first cryptographic public key;

an executable portion configured for decrypting the shared data record using the first cryptographic private key.

11. The computer program product of claim 7, wherein the computer-readable program code portions further comprise:

an executable portion configured for encrypting the shared data record using the second cryptographic public key; and an executable portion configured for decrypting the shared data record using the second cryptographic private key.

12. A computer-implemented method for multiplexing and demultiplexing two or more blockchains between a first networked system and a second networked system, wherein the first networked system comprises a first processor, a first memory device, and a first communication device, and a first blockchain application stored in the first memory device, wherein the first blockchain application comprises a first private blockchain comprising a first data record, wherein the second networked system comprises a second processor, a second memory device, and a second communication device, and a second blockchain application stored in the second memory device, wherein the second blockchain application comprises a second private blockchain comprising a second data record, said method comprising:

detecting, by the first processor executing the first blockchain application, a union between a first entity and a second entity, wherein detecting comprises:

publishing, by the first processor executing the first blockchain application, a merger request data record to the first private blockchain;

generating, by the first processor executing the first blockchain application, a first set of cryptographic key pairs, wherein the first set of cryptographic key pairs comprises a first cryptographic public key and a first cryptographic private key;

publishing, by the first processor executing the first blockchain application, a merger confirmation data record to the first private blockchain;

publishing, by the first processor executing the first blockchain application, a merger data record to the first private blockchain;

publishing, by the first processor executing the first blockchain application, a shared data record to the first private blockchain, wherein the shared data record is configured to be accessible by the first blockchain application and the second blockchain application;

detecting, by the second processor executing the second blockchain application, the union between the first entity and the second entity, wherein detecting comprises:

detecting, by the second processor executing the second blockchain application, the merger request data record;

publishing, by the second processor executing the second blockchain application, a merger acceptance data record to the second private blockchain; and generating, by the second processor executing the second blockchain application, a second set of cryptographic key pairs, wherein the second set of cryptographic key pairs comprises a second cryptographic public key and a first cryptographic private key;

publishing, by the second processor executing the second blockchain application, the merger data record to the second private blockchain; and publishing, by the second processor executing the second blockchain application, the shared data record to the second private blockchain.

13. The computer-implemented method of claim 12, the method further comprising:

detecting, by the first processor executing the first blockchain application, a dissolution of the union between the first entity and the second entity;

publishing, by the first processor executing the first blockchain application, a dissolution data record to the first private blockchain;

publishing, by the first processor executing the first blockchain application, a first private data record to the first private blockchain, wherein the first private data record is configured to be accessible by the first blockchain application;

detecting, by the second processor executing the second blockchain application, the dissolution of the union between the first entity and the second entity;

publishing, by the second processor executing the second blockchain application, the dissolution data record to the second private blockchain; and publishing, by the second processor executing the second blockchain application, a second private data record to the second private blockchain, wherein the second private data record is configured to be accessible by the second blockchain application.

14. The computer-implemented method of claim 13, wherein detecting the dissolution of the union between the first entity and the second entity comprises:

publishing, by the first processor executing the first blockchain application, a dissolution request data record to the first private blockchain;

publishing, by the first processor executing the first blockchain application, a dissolution confirmation data record to the first private blockchain;

detecting, by the second processor executing the second blockchain application, the dissolution request data record; and publishing, by the second processor executing the second blockchain application, a dissolution acceptance data record to the second private blockchain.

15. The computer-implemented method of claim 12, the method further comprising:
    encrypting, by the first processor executing the first blockchain application, the shared data record using a first cryptographic public key; and
    decrypting, by the second processor executing the second blockchain application, the shared data record using the first cryptographic private key.

16. The computer-implemented method of claim 12, the method further comprising:
    encrypting, by the second processor executing the second blockchain application, the shared data record using a second cryptographic public key; and
    decrypting, by the first processor executing the first blockchain application, the shared data record using the second cryptographic private key.

* * * * *